United States Patent
Hendry et al.

(10) Patent No.: US 9,501,426 B1
(45) Date of Patent: Nov. 22, 2016

(54) DYNAMIC TWO-TIER DATA STORAGE UTILIZATION

(71) Applicant: Workday, Inc., Pleasanton, CA (US)

(72) Inventors: Peter George Hendry, Auckland (NZ); Jonathan David Ruggiero, Walnut Creek, CA (US)

(73) Assignee: Workday, Inc., Pleasanton, CA (US)

( * ) Notice: Subject to any disclaimer, the term of this patent is extended or adjusted under 35 U.S.C. 154(b) by 433 days.

(21) Appl. No.: 13/763,555

(22) Filed: Feb. 8, 2013

(51) Int. Cl.
*G06F 12/00* (2006.01)
*G06F 12/12* (2016.01)

(52) U.S. Cl.
CPC .................................. *G06F 12/121* (2013.01)

(58) Field of Classification Search
CPC .................. G06F 3/057; G06F 3/0647
USPC ......................................................... 711/161
See application file for complete search history.

(56) References Cited

U.S. PATENT DOCUMENTS

| | | | |
|---|---|---|---|
| 6,092,071 A * | 7/2000 | Bolan et al. | |
| 6,101,575 A | 8/2000 | Simms et al. | |
| 8,280,853 B1 * | 10/2012 | Lai ................... | G06F 17/30073 707/651 |
| 8,478,731 B1 | 7/2013 | Throop et al. | |
| 8,660,991 B2 | 2/2014 | Glaude | |
| 8,667,494 B1 * | 3/2014 | Riordan et al. ............... | 718/104 |
| 2001/0047461 A1 * | 11/2001 | Milillo ............... | G06F 11/1448 711/162 |
| 2004/0088506 A1 * | 5/2004 | Chen ..................... | G06F 3/0608 711/162 |
| 2006/0277226 A1 * | 12/2006 | Chikusa ........... | G06F 17/30067 |
| 2007/0067362 A1 | 3/2007 | McArdle | |
| 2007/0156989 A1 * | 7/2007 | Man ..................... | G06F 3/0613 711/165 |
| 2009/0055399 A1 * | 2/2009 | Lu et al. ........................ | 707/10 |
| 2009/0177836 A1 * | 7/2009 | Mimatsu ..................... | 711/111 |
| 2011/0167236 A1 * | 7/2011 | Orikasa ................ | G06F 3/0608 711/165 |
| 2011/0289290 A1 | 11/2011 | Akirav et al. | |
| 2012/0278569 A1 | 11/2012 | Kawakami et al. | |
| 2013/0151774 A1 | 6/2013 | Bolik et al. | |
| 2013/0226829 A1 | 8/2013 | Rose et al. | |
| 2013/0282997 A1 * | 10/2013 | Suzuki .................. | G06F 3/0608 711/162 |
| 2014/0013030 A1 * | 1/2014 | Yeh .............................. | 711/103 |
| 2014/0068212 A1 * | 3/2014 | Lin ....................... | H04M 15/58 711/162 |
| 2014/0201487 A1 * | 7/2014 | Dudgeon .............. | G06F 3/0647 711/165 |

* cited by examiner

*Primary Examiner* — Charles Rones
*Assistant Examiner* — Nanci Wong
(74) *Attorney, Agent, or Firm* — Van Pelt, Yi & James LLP

(57) ABSTRACT

A system for dynamically utilizing data storage comprises a processor and a memory. The processor is configured to determine whether a data storage criterion is satisfied; and, in the event that the data storage criterion is satisfied: determine a new archiving threshold based on a target data storage usage level; and set the archiving threshold. The memory is coupled to the processor and is configured to provide the processor with instructions.

19 Claims, 8 Drawing Sheets

DYNAMIC TWO-TIER DATA STORAGE UTILIZATION

BACKGROUND OF THE INVENTION

Modern database systems can contain very large amounts of data. As storage costs decrease, database systems take advantage of the easy availability of extra capacity, storing more and more data that might not have previously been deemed worthwhile to keep. A database storage system that stores too much data in its online transactional systems can suffer performance degradation due to processing overhead. A common method of addressing this difficulty is to separate the data storage between two systems, an online system that can access data more readily and an offline system that can store data without affecting the performance of the online system. When data from the offline system is required, it is requested and transferred to the online system. Determining which data are important enough to store in the online system is a very taxing job for a system administrator, and the division of data must be kept up to date as new data are added and usage patterns change.

BRIEF DESCRIPTION OF THE DRAWINGS

Various embodiments of the invention are disclosed in the following detailed description and the accompanying drawings.

DETAILED DESCRIPTION

Figure 1:
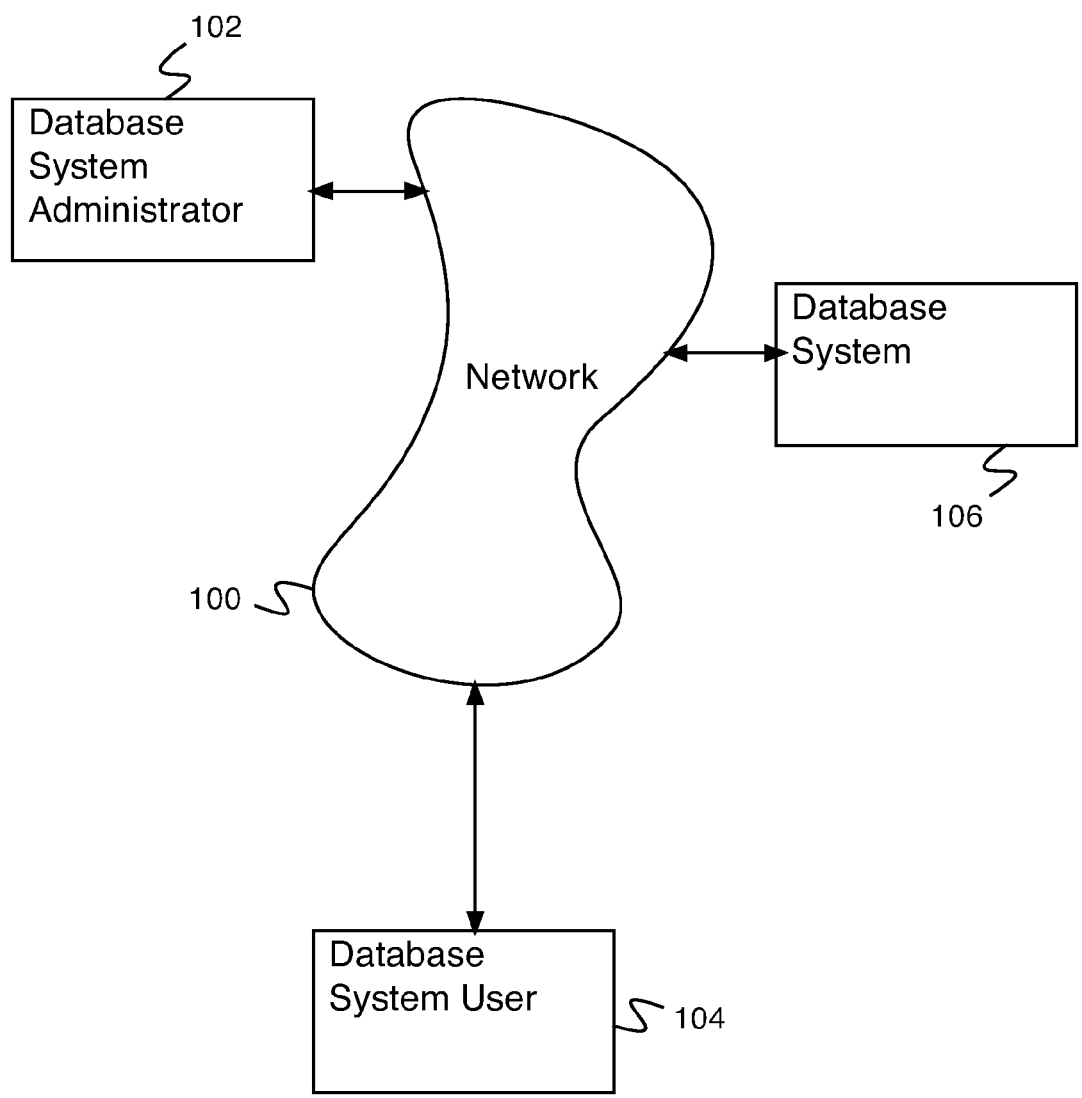
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic data storage utilization is disclosed. A system for adjusting an archiving threshold comprises a processor and a memory. The processor is configured to: determine whether a data storage criterion is satisfied; and in the event that the data storage criterion is satisfied: determine a new archiving threshold based on a target usage level and set the archiving threshold. The memory is coupled to the processor and is configured to provide the processor with instructions.

Data in a database system is stored divided between two data storage units. A first data storage stores uncompressed data within a transactional server (e.g., in randomly accessible memory (RAM), in a conventional hard drive, in a solid-state memory, in a multi-tiered memory, etc.). A second data storage stores compressed data within the transactional server (e.g., in RAM, in a conventional hard drive, in a solid-state memory, in a multi-tiered memory, etc.). In some embodiments, the first data storage and the second data storage comprise a single data storage device. In some embodiments, data objects are initially (e.g., upon system startup) stored as compressed objects in the second data storage. In some embodiments, data objects are initially stored as compressed objects in the second data storage and as uncompressed objects in the first data storage. The transaction server additionally comprises a transaction processing engine for processing transactions. The transaction processing engine comprises a local data storage for storing data during transaction processing. In some embodiments, the local data storage comprises a temporary data storage. In some embodiments, in the event that a data object is needed, the data object is copied from the first data storage to the local data storage and provided for use in transaction processing using a processor of the database system. In some embodiments, in the event that a data object is needed, the data object is copied from the second data storage to the local data storage, uncompressed, and provided for use in transaction processing using a processor of the database system. In some embodiments, when transaction processing is complete, it is determined that the data object is to be stored in uncompressed format in the first data storage. In some embodiments, when transaction processing is complete, it is determined that the data object is to be compressed and stored in the second data storage. In some embodiments, determining whether the data object is to be stored in uncompressed format in the first data storage or to be compressed and stored in the second data storage is performed using a keep threshold. In various embodiments, a keep threshold comprises an activity threshold, a performance threshold, or any other appropriate threshold. In some embodiments, an activity threshold comprises a threshold based on a usage amount (e.g., access per time period, accesses per day, accesses per hour, etc.). In some embodiments, a performance threshold comprises a threshold based on processing capability (e.g., transactions completed per minute, calculations per hour, accesses per day, etc.).

In some embodiments, memory is reclaimed on the first data storage device. In some embodiments, memory is reclaimed on the first data storage device using an archiving threshold. In various embodiments, an archiving threshold comprises an activity threshold, a performance threshold, or any other appropriate threshold. In some embodiments, the archiving threshold is determined on the fly (e.g., dynamically, continuously, periodically, etc.). In some embodiments, the archiving threshold is determined in response to a data storage criterion being satisfied. In some embodiments, determining whether a data storage criterion is satisfied comprises determining whether a server storage is above a threshold. In various embodiments, determining whether a server storage is above a threshold occurs at one of the following: continuously, periodically, at a fixed time, at a regular interval, or at any other appropriate time. A threshold data capacity (e.g., an upper bound) and a target data capacity (e.g., optimum capacity or desired capacity utilization of a data storage) less than the threshold data capacity for the first data storage are received (e.g., specified by a user, preset, default set, etc.).

In some embodiments, if the threshold data capacity is reached, data objects stored in the first data storage are analyzed. It is first determined how much data to remove from the first data storage to reach the target data capacity. It is then determined, using the current usage patterns, an archiving threshold that will result in a sufficient number of data objects archived to remove the desired amount of data. In some embodiments, determining the new archiving threshold comprises determining a set of objects to remove to meet the target data storage usage level. For example, each object is associated with an activity level and the objects are put in an ordered list by activity level. Either serially or in parallel, for a given archiving threshold, the system determines the objects that are above the threshold and the storage space required to store those objects. The archiving threshold that, when selected, would closest achieve the target data capacity is indicated to be selected. In some embodiments, the archiving threshold that, when selected, would achieve a memory usage just below the target data capacity is indicated to be selected. The archiving threshold is then set to the new value. In various embodiments, the first data storage is then processed to archive all data objects with activity below the archiving threshold; data objects are left on the first data storage when the archiving threshold is changed and are archived at a predetermined time; data objects are left on the first data storage when the archiving threshold is changed and are archived when other processing activity is below a threshold, or data objects are archived at any other appropriate time.

In some embodiments, a performance metric is monitored (e.g., continuously, periodically, etc.). Determining whether a data storage criterion is satisfied comprises determining whether a performance metric criterion is satisfied. A table or model is used to relate data storage usage and performance as measured by the metric. For example, transaction processing rate, data storage access time, calculation speed of the system are related to data storage usage (e.g., stored objects as a percentage of the first data storage total capacity). In the event that the performance metric dips below a performance threshold, the system determines based on the model or table, the data storage usage to achieve the target performance. The system indicates that this data storage usage is the new target and removes objects from the first data storage by archiving the objects to a second data storage. In some embodiments, the objects are selected based on their activity level. In some embodiments, objects are selected based on their last access time. In some embodiments, objects are selected based on a combination of their last access time and activity level.

In some embodiments, time is divided into N 'ticks'. A tick does not necessarily map to a time period—it could map to an amount of memory consumption (for example, if the difference between the lower and upper thresholds is 8 GB and we have 16 ticks then we could advance the tick each time 0.5 GB is consumed). In some embodiments, time starts at tick 0. An object is marked with the last tick in which it was accessed. An access count is kept for the object and the last tick it was accessed in. The higher the tick value of an object the more recently it was accessed. An object has only 1 tick value at any time and that value will move only upwards. When cleaning up, the tick value of each object is used to identify the objects more recently accessed to get us close to the reclaim target—for example, examining from tick 0 forward calculating how much memory reclaiming objects last accessed in that tick would reclaim. Once the segment is found which would push the system over the memory target that is being looked for, the segment is examined and the threshold approach is applied using the access counts to first work out a threshold that would reclaim enough objects to satisfy the memory target, and then use that threshold when reclaiming the objects. Future ticks (after the one determined to provide enough reclaimed memory) have no objects reclaimed and the tick values for those objects are reset to 0 and the cycle starts again.

FIG. 1 is a block diagram illustrating an embodiment of a network system. In the example shown, the network system comprises database system administrator 102, database system user 104, and database system 106, communicating via network 100. In various embodiments, network 100 comprises one or more of the following: a local area network, a wide area network, a wired network, a wireless network, the Internet, or any other appropriate network. Database system 106 comprises a database system for storage and retrieval of information. In some embodiments, database system 106 comprises a system for analysis of information. In some embodiments, database system 106 comprises a distributed database, e.g., a database system comprising multiple computers not necessarily in the same location. In some embodiments, database system 106 comprises a system for executing business processes. In some embodiments, database system 106 comprises a system comprising dynamic data storage utilization.

Database system administrator 102 comprises a database system administrator administrating database system 106. In some embodiments, database system administrator 102 comprises an employee at a company purchasing database system services. In some embodiments, administrating database system 106 comprises preparing, configuring, or modifying database system 106 as desired by database system users (e.g., database system user 104). In some embodiments, database system administrator 102 configures and modifies database system 106 in ways not available to database system user 104. Database system user 104 comprises a database user accessing database services on database system 106. In some embodiments, database system user 104 comprises a user who uses a user interface (e.g., a keyboard, a touch screen, a display, etc.) to interact with database system 106. In various embodiments, the user interface is associated with a desktop computer, a laptop computer, a local terminal, or any other appropriate system with a user interface. In some embodiments, database system user 104 comprises an employee at a company purchasing database system services. In various embodiments, there is/are 1, 2, 4, 13, 22, 115, or any other appropriate number of database system users accessing database services on database system 106. In some embodiments, each database system user only has access to their own data stored on database system 106 and is able to utilize database system 106 as though they are the sole database system user. For example, the system is a tenanted system where each tenant is only able to access their own data. In some embodiments, a tenant or user associated with the tenant has access to tenant specific objects as well as universally or system accessible objects. In some embodiments, database system user 104 configures services on database system 106. In some embodiments, the ability of database system user 104 to configure database system 106 is limited compared with that of database system administrator 102. In some embodiments, a database system user (e.g., database system user 104) comprises a person accessing database system 106 via a user interface, e.g., a web page. In some embodiments, a database system user comprises an automated system accessing database system 106 via a machine interface, e.g., a public application programming interface (API).

Figure 2:
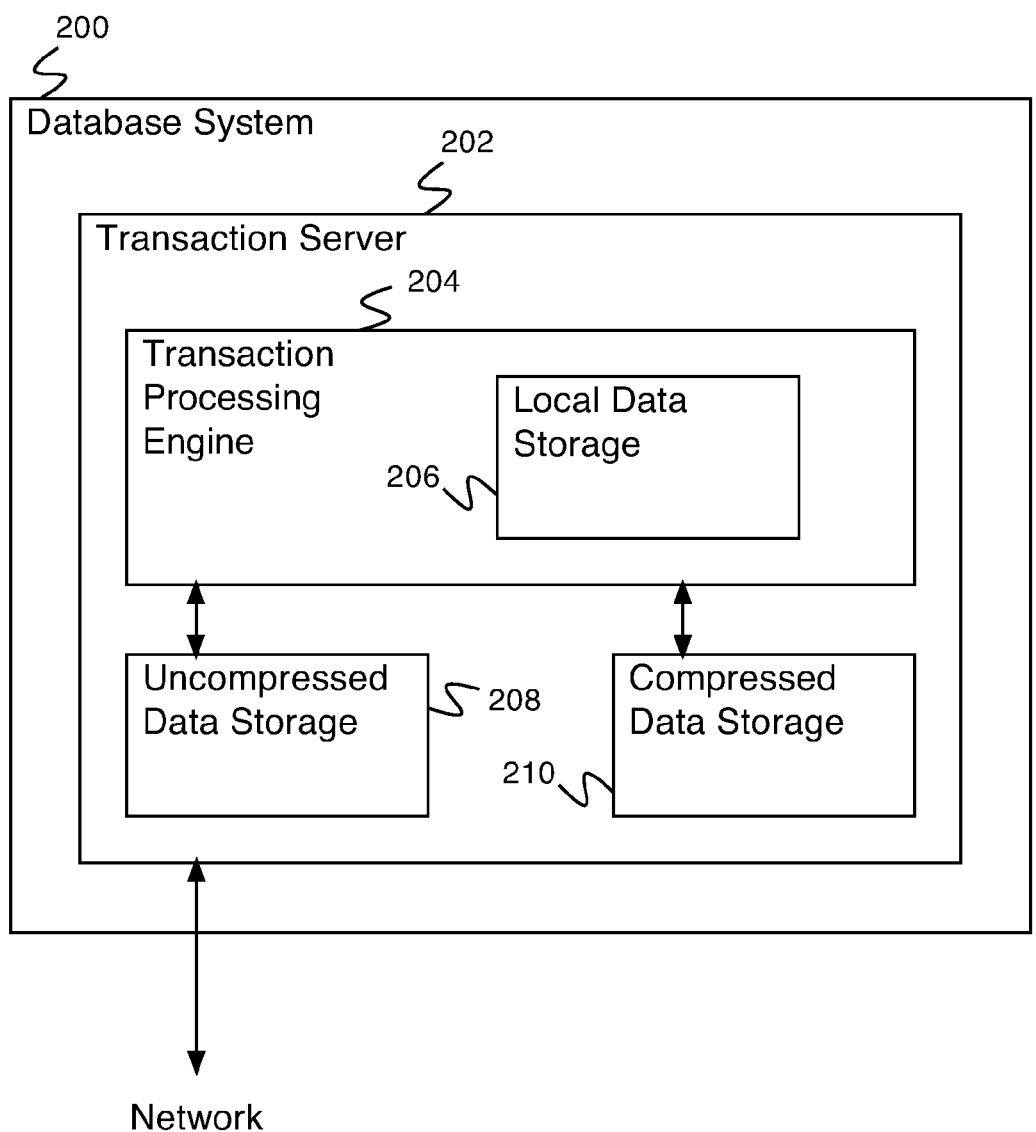
FIG. 2 is a block diagram illustrating an embodiment of a database system.

FIG. 2 is a block diagram illustrating an embodiment of a database system. In some embodiments, database system 200 comprises database system 106 of FIG. 1. In the example shown, transaction server 202 communicates with a network, e.g., network 100 of FIG. 1. Transaction server 202 comprises a system for responding to transaction requests. In various embodiments, transaction requests comprise data requests, sorted data requests, filtered data requests, data modification requests, data entry requests, or any other appropriate transaction requests. In some embodiments, database system 200 additionally comprises a data server. Transaction server 202 comprises transaction processing engine 204. Transaction processing engine 204 comprises an engine for processing transaction requests, e.g., transaction requests received over the network. Transaction processing engine 204 additionally comprises local data storage 206. Local data storage 206 comprises a local data storage for storing data while it is used by transaction processing engine 204.

Uncompressed data storage 208 comprises data storage utilized by transaction processing engine for processing transaction requests. In some embodiments, if a transaction request comprising a data request comprises a data request for data stored on uncompressed data storage 208, transaction processing engine 204 retrieves the requested data from uncompressed data storage 208 and stores the data in local data storage 206. In some embodiments, uncompressed data storage 208 has unlimited capacity (e.g., additional capacity can be added whenever the available capacity is filled). In some embodiments, there is a practical limit to the capacity of uncompressed data storage 208 (e.g., past a certain capacity the performance of transaction processing engine 204 falls to an unacceptable level). When there is a limit to the capacity of uncompressed data storage 208, data exceeding the capacity of uncompressed data storage 208 must be stored in another location.

Transaction server 202 additionally comprises compressed data storage 210. Compressed data storage 210 stores data in compressed format. In some embodiments, compressed data storage 210 comprises a backup or auxiliary copy of data stored in uncompressed data storage 208. In some embodiments, compressed data storage 210 can store data without the practical capacity limit of uncompressed data storage 208 (e.g., the amount of data stored in compressed data storage 210 does not affect the performance of transaction processing engine 204). In some embodiments, compressed data storage 210 has unlimited capacity (e.g., additional capacity can be added whenever the available capacity is filled). In some embodiments, uncompressed data storage 208 stores database data (e.g., data accessed by transaction processing engine 204) up to its practical capacity and compressed data storage 210 stores overflow database data (e.g., database data past the practical capacity of uncompressed data storage 208). In some embodiments, compressed data storage 210 stores all database data stored by database system 200 and uncompressed data storage 208 stores a subset of the data stored in compressed data storage 210. In some embodiments, the subset of data stored in compressed data 210 that is also stored in uncompressed data storage 208 is a predetermined subset of data indicated e.g., by a list of data elements to store in uncompressed format. In some embodiments, uncompressed data storage 208 and compressed data storage 210 store data as a collection of data objects. In some embodiments, data objects stored in uncompressed data storage 208 are stored in a data structure relating to their content, e.g., in a tree, graph, or other appropriate data structure. In some embodiments, data objects stored in compressed data storage 210 are stored in a data structure optimized for efficient storage of a large number of data objects, and not necessarily related to their content. In some embodiments, when data objects requested by transaction processing engine 204 are stored on compressed data storage 210 but not on uncompressed data storage 208, the data objects are requested from compressed data storage 210 by transaction processing engine 204, uncompressed, and stored in local data storage 206.

In some embodiments, when transaction processing is complete, if the usage of a data object stored in local data storage 206 is above a keep threshold, the data object is stored in uncompressed data storage 208 and deleted from local data storage 206. In some embodiments, when a system is initialized (e.g., started up), all database data is stored in compressed data storage 210 and none is stored in uncompressed data storage 208, and uncompressed data storage 208 is filled as data objects are requested by transaction processing engine 204 and found to have usage above the keep threshold. In some embodiments, when a system is initialized (e.g., started up), a predetermined subset of data indicated e.g., by a list of data objects is transferred from compressed data storage 210 to uncompressed data storage 208, uncompressed, and stored. In some embodiments, when transaction processing is complete, if the usage of a data object stored in local data storage 206 is not above a keep threshold, the data object is compressed and stored in compressed data storage 210 and deleted from local data storage 206. In some embodiments, when transaction processing is complete, if the usage of a data object stored in local data storage 206 is not above a keep threshold, the data object is additionally deleted from uncompressed data storage 208. In some embodiments, a keep threshold is based at least in part on an archiving threshold. In various embodiments, a keep threshold comprises the number of times stored data was accessed in a given day, a frequency of stored data access, or any other appropriate activity threshold. In some embodiments, a keep threshold is manually determined, e.g., is set by a system designer or a system administrator (e.g., database system administrator 102 of FIG. 1). In some embodiments, a keep threshold is set dynamically.

In some embodiments, data objects stored in compressed data storage 210 comprise an indicator indicating whether, after transaction processing is complete, they should be left in uncompressed format and transmitted to uncompressed data storage 208 or compressed and transmitted to compressed data storage 210. In some embodiments, an indicator indicating whether data objects should be transmitted to uncompressed data storage 208 or compressed and transmitted to compressed data storage 210 once a transaction is complete is set based on a keep threshold.

When the system is configured (e.g., by database system administrator 102 of FIG. 1), a storage threshold value and a storage target value are set. At predetermined intervals (e.g., once an hour, once a day, once a week, each time data is stored, etc.), it is determined whether uncompressed data storage 208 has more data stored than the storage threshold value. If it is determined that more data is stored than the storage threshold value, a new archiving threshold is determined. A new archiving threshold is determined by examining the activity of data objects stored in uncompressed data storage 208 and setting the archiving threshold such that enough data objects will be removed so the amount of data stored in uncompressed data storage 208 will fall to the storage target value. In some embodiments, when the new archiving threshold is determined, data objects stored in uncompressed data storage 208 are examined, and any data object which has activity below the archiving threshold is immediately removed from uncompressed data storage 208.

In some embodiments, a server has "metadata" about objects. Some metadata is design-time (i.e., defining how a specific object should be handled in all cases, etc.). Other metadata is runtime, which is how we would track the access count for each data instance. So, the server really has a bit of info about each data instance at runtime that tracks its access count.

In some embodiments, when the archive threshold is determined objects are or are not marked to be removed or not removed. In some embodiments, the archive threshold is compared against the current activity indicator on the object and as that is done the object is either removed or kept. In some embodiments, there are two passes—one to mark objects and the other to remove them. In some embodiments, the archive threshold comprises some simple numeric value. In some embodiments, the archive threshold comprises a combination of criteria (e.g., most recently accessed, least recently used, access count, access frequency, etc.).

Figure 3:
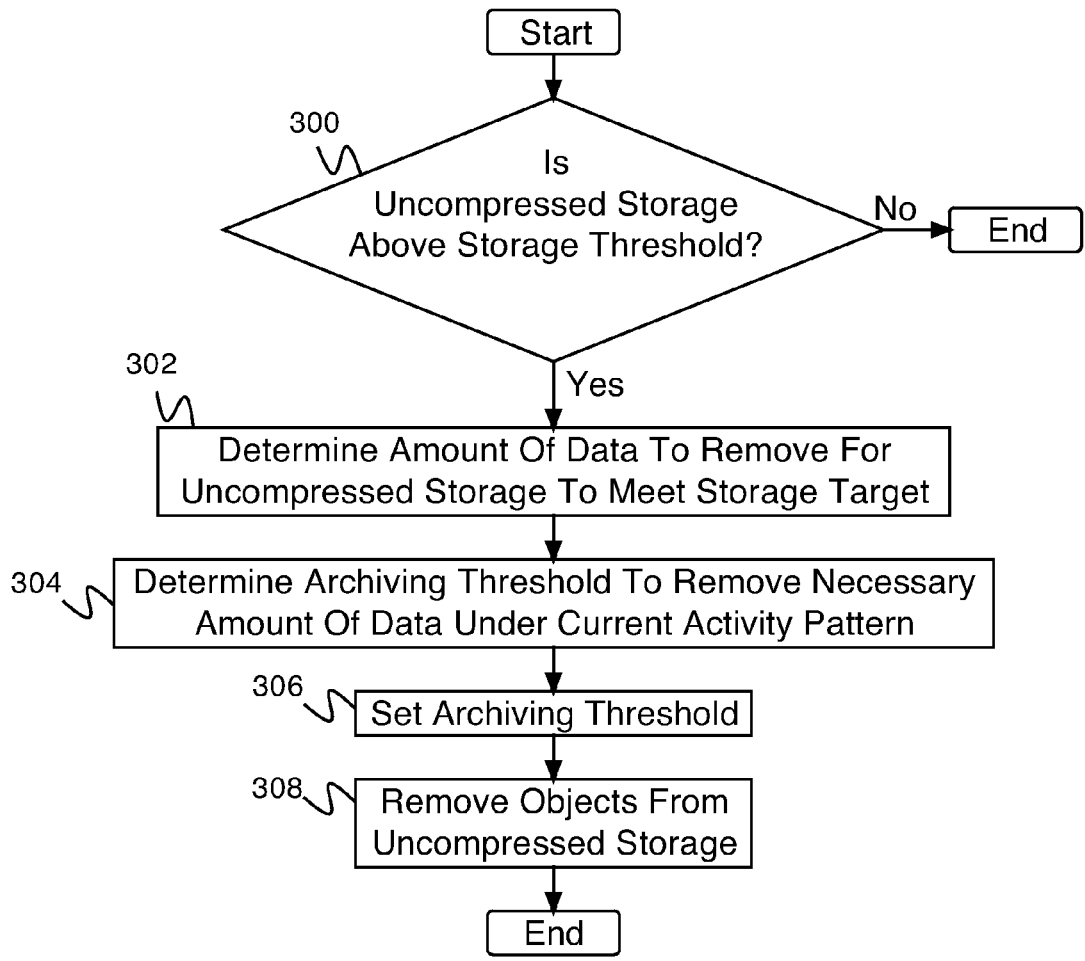
FIG. 3 is a flow diagram illustrating an embodiment of a process for archiving.

FIG. 3 is a flow diagram illustrating an embodiment of a process for archiving. In some embodiments, the process for archiving comprises dynamically setting an archiving threshold. In some embodiments, dynamic data storage utilization comprises dynamically setting an archiving threshold. In some embodiments, the process of FIG. 3 is executed by a transaction server (e.g., by transaction server 202 of FIG. 2). In some embodiments, the process of FIG. 3 is executed at predetermined intervals (e.g., once an hour, once a day, once a week, each time data is stored, etc.). In the example shown, in 300, it is determined whether uncompressed storage (e.g., uncompressed data storage 208 of FIG. 2) is above the storage threshold (e.g., a storage threshold determined by database system administrator 102 of FIG. 1). In various embodiments, determining whether uncompressed storage is above the storage threshold occurs continuously, periodically, at a fixed time, at regular interval, or any other appropriate time. In some embodiments, determining whether uncompressed storage is above the storage threshold comprises determining whether a data storage criterion is satisfied. In some embodiments, determining whether uncompressed storage is above the threshold comprises determining whether a storage usage is above a threshold. In some embodiments, determining whether uncompressed storage is above the threshold comprises determining whether a performance metric criterion is satisfied. A table or model is used to relate uncompressed data storage usage and performance as measured by the metric. If it is determined that uncompressed storage is not above the storage threshold, the process ends. If it is determined that uncompressed storage is above the storage threshold, control passes to 302. In 302, the amount of data to remove for uncompressed storage to meet the storage target (e.g., a storage target determined by database system administrator 102 of FIG. 1) is determined. In some embodiments, a storage target comprises a target usage level. In 304, an archiving threshold to remove the necessary amount of data (e.g., the amount of data determined in 302) is determined. In some embodiments, an archiving threshold comprises an activity threshold. In various embodiments, an archiving threshold comprises the number of times stored data was accessed in a given day, a frequency of stored data access, or any other appropriate activity threshold. Increasing the archiving threshold will reduce the number of objects that meet it, reducing the number of objects stored in uncompressed data storage 208 of FIG. 2 after archiving. In some embodiments, the archiving threshold is determined by ordering objects stored in uncompressed storage by activity level and determining the archiving threshold to remove the necessary amount of data (e.g., the total data comprised by objects below the archiving threshold is as close as possible the amount of data determined in 302). In some embodiments, the archiving threshold is determined by determining the amount of data that would be removed for one or more test archiving thresholds and choosing the archiving threshold that removes the closest to the necessary amount of data (e.g., amount of data determined in 302). In 306, the archiving threshold is set (e.g., the archiving threshold determined in 304 is stored as the new archiving threshold). In 308, objects are removed from the uncompressed storage. In some embodiments, objects that do not meet the archiving threshold are removed from the uncompressed storage.

In some embodiments, the archive threshold is not stored. The archive threshold is a dynamic value which has a one-off use while clearing objects for a specific cleanup run. It does not persist and get used as a threshold going forward. In some embodiments, there are two thresholds at work. The first is a keep threshold at which we transition an object from compressed to being kept uncompressed (the keep-threshold)—this threshold may be adjusted after cleanup based on something like the time between cleanups (move up or down to adjust towards a target time). Then there is the archive threshold which is calculated for the recompression activity and then discarded. This archive threshold could be used as an input when recalculating the keep-threshold.

Figure 4:
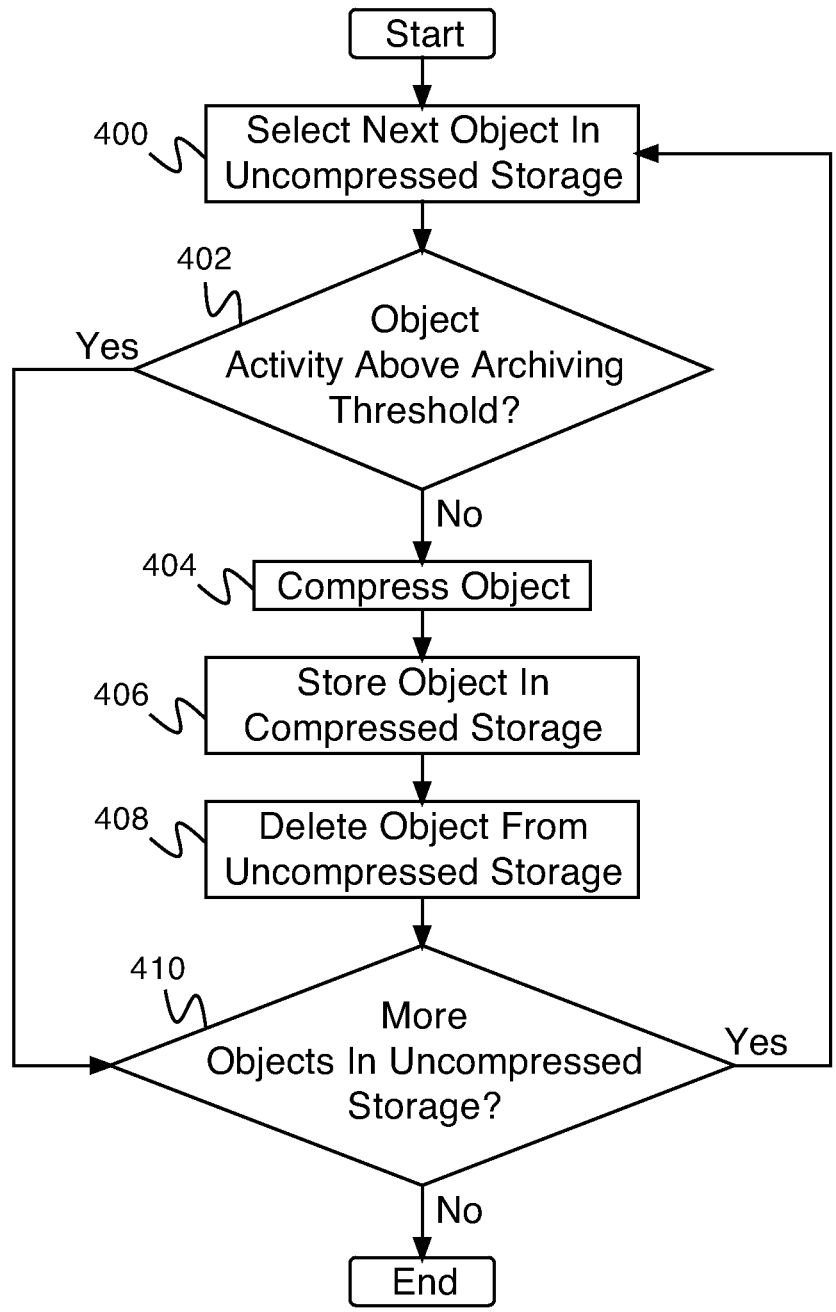
FIG. 4 is a flow diagram illustrating an embodiment of a process for removing objects from uncompressed storage.

FIG. 4 is a flow diagram illustrating an embodiment of a process for removing objects from uncompressed storage. In some embodiments, the process of FIG. 4 implements 308 of FIG. 3. In the example shown, in 400, the next object in uncompressed storage (e.g., a data object stored in uncompressed data storage 206 of FIG. 2) is selected. In 402 it is determined whether the object activity is above the archiving threshold. In some embodiments, determining the object activity comprises determining how often the object was accessed, e.g., over the past day, over the past week, over the past month, or over any other appropriate time period. If it was determined that the object activity is above the archiving threshold, control passes to 410. If it was determined that the object activity is not above the archiving threshold, control passes to 404. In 404, the object is compressed. In 406, the object is stored in compressed storage (e.g., compressed data storage 210 of FIG. 2). In 408, the object is deleted from the uncompressed storage. In some embodiments, the process of compressing an object, storing it in compressed storage, and deleting it from uncompressed storage comprises archiving an object. In 410, it is determined if there are more objects in uncompressed storage. If it is determined that there are more objects in uncompressed storage, control passes to 400. If it is determined that there are no more objects in uncompressed storage, the process ends.

Figure 5A:
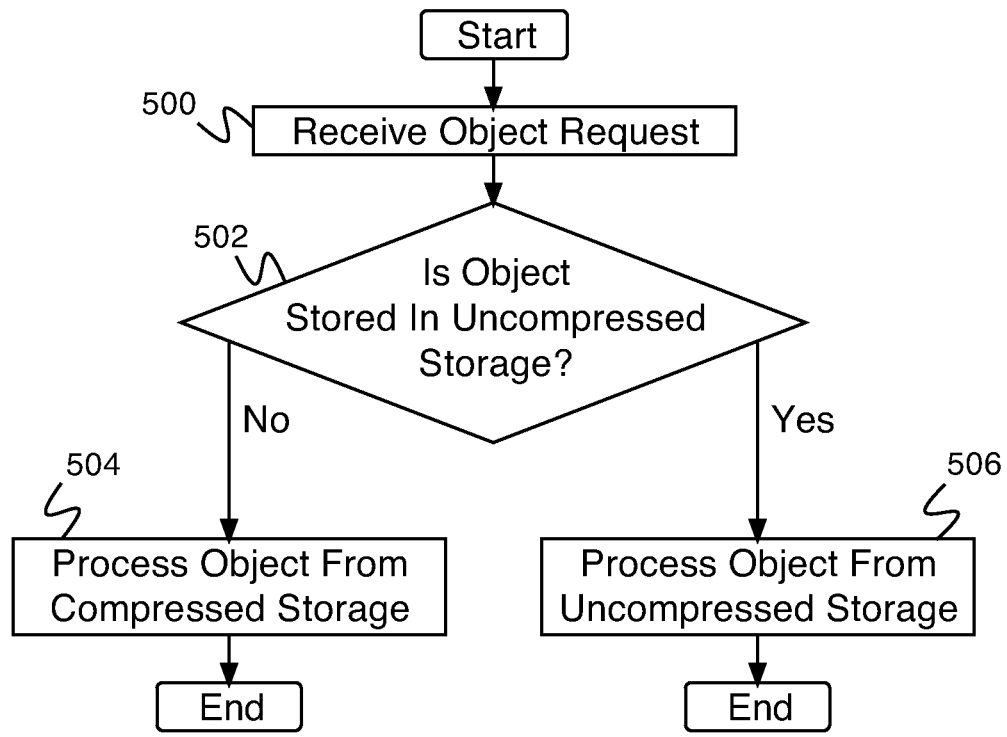
FIG. 5A is a flow diagram illustrating an embodiment of a process for processing an object request.

FIG. 5A is a flow diagram illustrating an embodiment of a process for processing an object request. In some embodiments, the process of FIG. 5 is executed by a transaction server (e.g., by transaction server 202 of FIG. 2). In the example shown, in 500, an object request is received. In some embodiments, an object request comprises a request for data from a database user (e.g., from database system user 104 of FIG. 1). In 502, it is determined whether the object is stored in uncompressed storage (e.g., in uncompressed data storage 208 of FIG. 2). In various embodiments, it is determined whether the object is stored in uncompressed storage using a data storage index, a transaction history, a server log, or using any other appropriate means. If it is determined that the object is not stored in uncompressed storage, control passes to 504. In 504, the object is processed from compressed storage, and the process ends. If it is determined in 502 that the object is stored in uncompressed storage, control passes to 506. In 506, the object is processed from uncompressed storage, and the process ends.

Figure 5B:
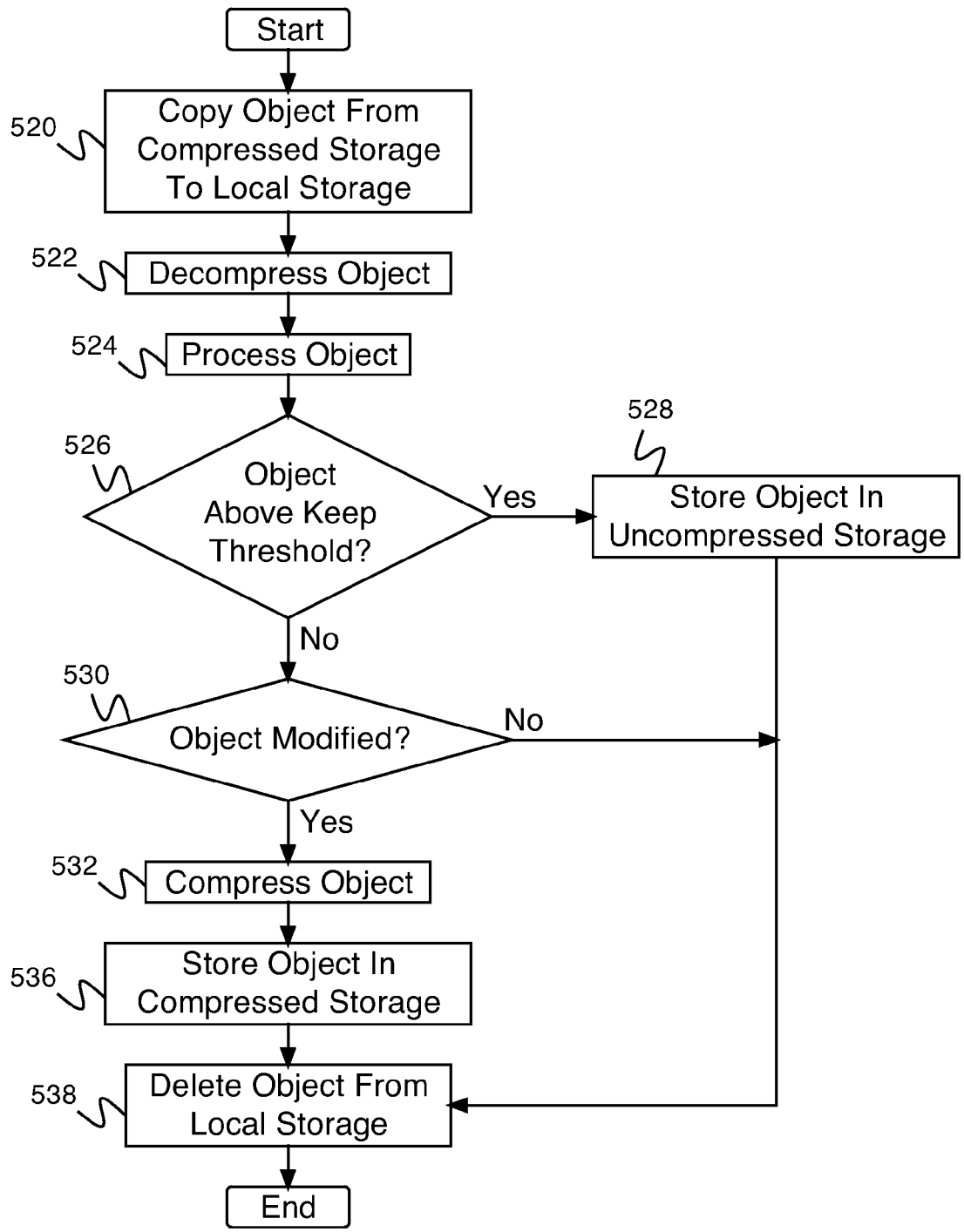
FIG. 5B is a flow diagram illustrating an embodiment of a process for processing an object from compressed storage.

FIG. 5B is a flow diagram illustrating an embodiment of a process for processing an object from compressed storage. In some embodiments, the process of FIG. 5B implements 504 of FIG. 5A. In the example shown, in 520, the object is copied from compressed storage (e.g., compressed data storage 210 of FIG. 2) to local storage (e.g., local data storage 204 of FIG. 2). In 522, the object is decompressed. In 524, the object is processed (e.g., an object request is processed). In some embodiments, processing the object comprises modifying it. In some embodiments, processing the object does not comprise modifying it. In 526, it is determined whether the object is above the keep threshold. In some embodiments, determining whether the object is above the keep threshold comprises determining whether the object activity is above the keep threshold. In some embodiments, it is determined whether the object is above the keep threshold using an indication stored with the object. If it is determined that the object is above the keep threshold, control passes to 528. In 528, the object is stored in uncompressed storage (e.g., uncompressed data storage 208 of FIG. 2). Control then passes to 538. If it is determined in 526 that the object is not above the keep threshold, control passes to 530. In 530, it is determined whether the object was modified (e.g., whether the object was modified in 524). If it is determined that the object was not modified (e.g. the version of the object stored in local storage is identical to the version of the object stored in compressed storage), control passes to 538. If it is determined that the object was modified (e.g., the version of the object stored in local storage is different from the version of the object stored in compressed storage), control passes to 532. In 532, the object is compressed. In 536, the object is stored in compressed storage. In 538, the object is deleted from local storage.

Figure 5C:
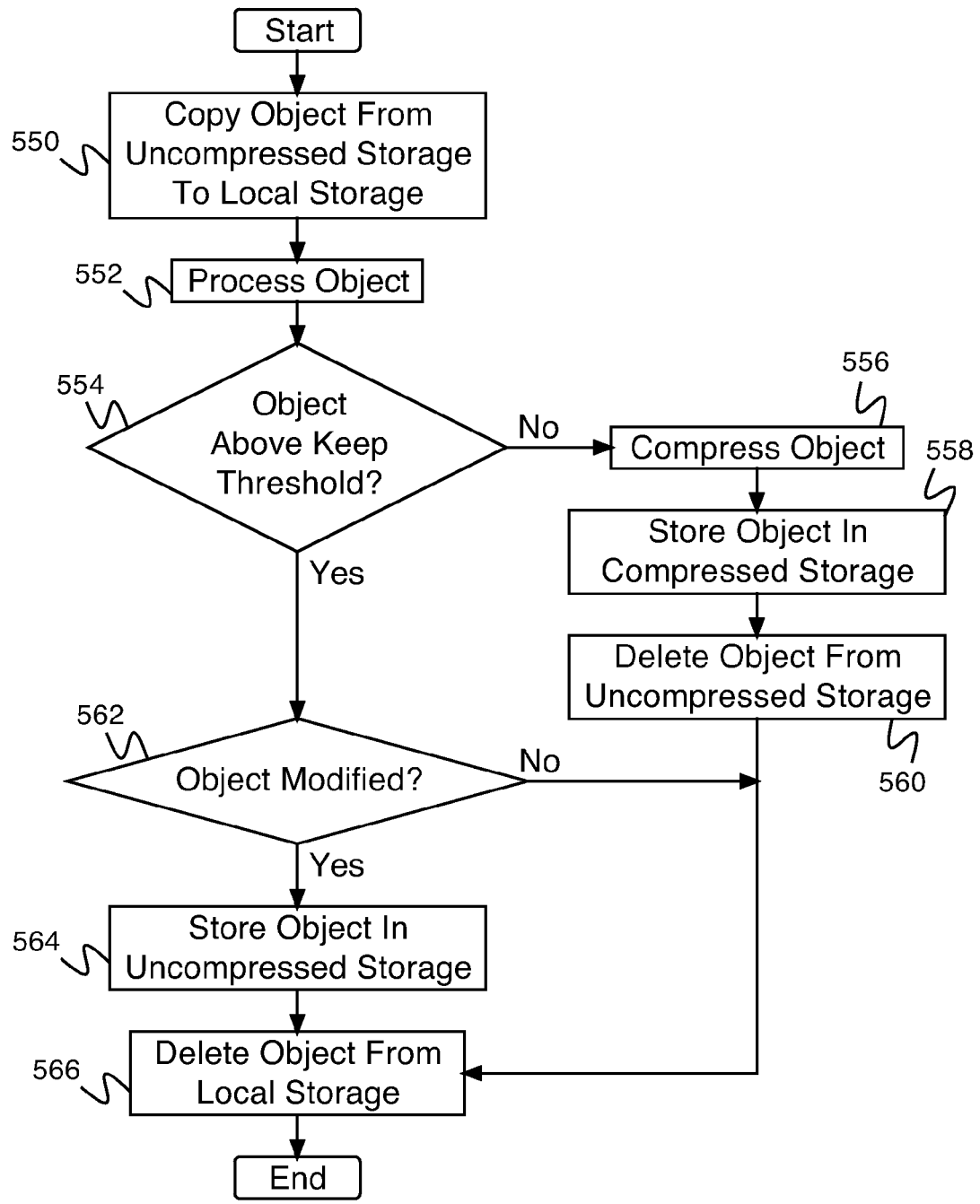
FIG. 5C is a flow diagram illustrating an embodiment of processing an object from uncompressed storage.

FIG. 5C is a flow diagram illustrating an embodiment of processing an object from uncompressed storage. In some embodiments, the process of FIG. 5C implements 506 of FIG. 5A. In the example shown, in 550, the object is copied from uncompressed storage (e.g., uncompressed storage 208 of FIG. 2) to local storage (e.g., local storage 206 of FIG. 2). In 552, the object is processed (e.g., an object request is processed). In some embodiments, processing the object comprises modifying it. In some embodiments, processing the object does not comprise modifying it. In 554, it is determined with the object is above the keep threshold. In some embodiments, determining whether the object is above the keep threshold comprises determining whether the object activity is above the keep threshold. In some embodiments, it is determined whether the object is above the keep threshold using an indication stored with the object. If it is determined that the object is not above the keep threshold, control passes to 556. In 556, the object is compressed. In 558, the object is stored in compressed storage (e.g., compressed data storage 210 of FIG. 2). In 560, the object is deleted from uncompressed storage. Control then passes to 566. If it is determined in 554 that the object is above the keep threshold, control passes to 562. In 562, it is determined whether the object was modified (e.g., whether the object was modified in 552). If it is determined that the object was not modified (e.g. the version of the object stored in local storage is identical to the version of the object stored in uncompressed storage), control passes to 566. If it is determined that the object was modified (e.g., the version of the object stored in local storage is different from the version of the object stored in uncompressed storage), control passes to 564. In 564, the object is stored in uncompressed storage. In 566, the object is deleted from local storage.

Figure 6:
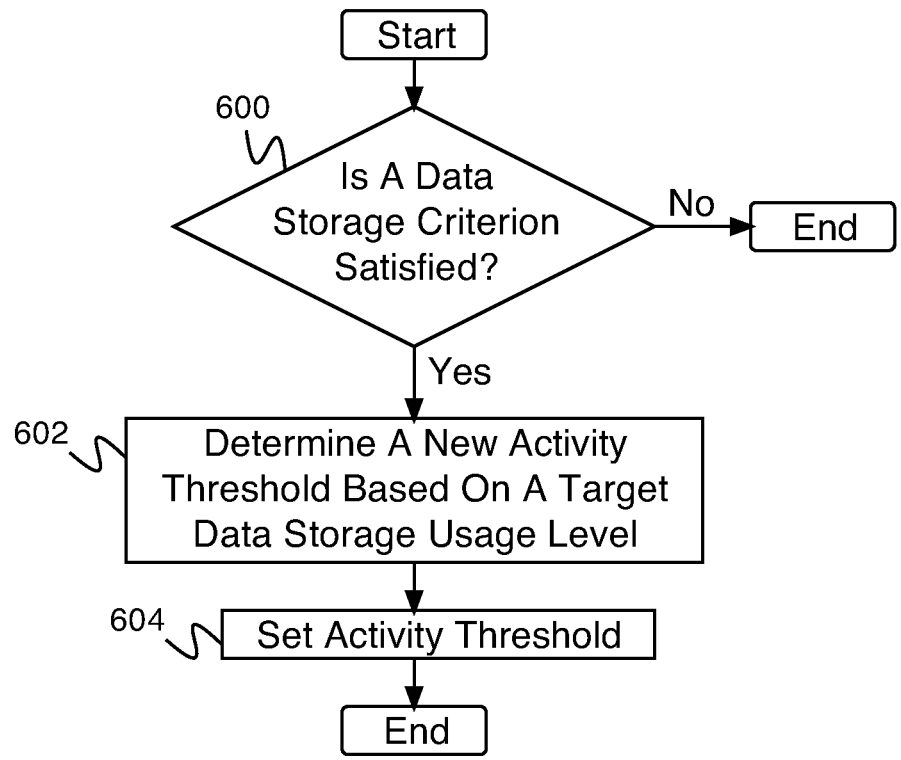
FIG. 6 is a flow diagram illustrating an embodiment of a process for dynamically utilizing data storage.

FIG. 6 is a flow diagram illustrating an embodiment of a process for dynamically utilizing data storage. In some embodiments, the process of FIG. 6 is executed by a transaction server (e.g., transaction server 202 of FIG. 2). In the example shown, in 600, it is determined whether a data storage criterion is satisfied. In some embodiments, determining whether a data storage criterion is satisfied comprises determining whether the amount of data stored in a data storage exceeds a threshold. If it is determined that the data storage criterion is not satisfied, the process ends. If it is determined that the data storage criterion is satisfied, control passes to 602. In 602, a new activity threshold is determined based on a target data storage usage level. In some embodiments, the new activity threshold comprises an archiving threshold. In some embodiments, the new activity threshold comprises a keep threshold. In some embodiments, the target data storage usage level comprises an uncompressed data storage level. In 604, the activity threshold is set (e.g., the new activity threshold is stored as the current activity threshold).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for dynamically utilizing data storage, comprising:
   a processor configured to:
   retrieve a data object and store the data object in a local data storage, wherein the data object comprises an indicator, the indicator indicating whether, after processing the data object is complete, the data object is to be stored in a first data storage corresponding to uncompressed data storage, or compressed and stored in a second data storage corresponding to compressed data storage, wherein the indicator is based on a keep threshold;
process the data object stored in the local data storage;
after processing the data object, store the data object in the first data storage or compress and store the data object in the second data storage based on the indicator;
determine whether an archiving threshold for the first data storage is satisfied; and
in the event that the archiving threshold for the first data storage is satisfied:
determine a first archiving threshold based on a target data storage usage level, wherein determining the first archiving threshold comprises one of:
ordering objects stored in the first data storage by activity level and determining an activity threshold to remove a necessary amount of data for a data storage usage to be below the target data storage usage level; and
determining the necessary amount of data that would be removed for one or more test archiving thresholds, and choosing the test archiving threshold that removes closest to the necessary amount of data; and
setting a new archiving threshold based at least in part on the first archiving threshold; and
a memory coupled to the processor and configured to provide the processor with instructions.

2. The system as in claim 1, wherein the processor is further configured to determine a set of data objects to remove from the first data storage to meet the target data storage usage level.

3. The system as in claim 2, wherein the set of data objects is determined based on the first archiving threshold.

4. The system as in claim 2, wherein the set of data objects is determined by comparing object activity level with the first archiving threshold.

5. The system as in claim 2, wherein the set of data objects is removed by storing the set of data objects as compressed data objects in the second data storage and deleting the set of data objects from the first data storage.

6. The system as in claim 1, wherein data objects are initially stored as compressed data objects in the second data storage.

7. The system as in claim 1, wherein data objects are initially stored as compressed data objects in the second data storage and as uncompressed data objects in the first data storage.

8. The system as in claim 1, wherein the processor is further configured to:
in the event that a request to process the data object is received,
determine whether to retrieve the data object from the first data storage or the second data storage.

9. The system as in claim 8, wherein determining whether to retrieve the data object from the first data storage or the second data storage comprises determining whether the data object is stored in the first data storage.

10. The system as in claim 8, wherein the processor is further configured to:
in the event that it was determined to retrieve the data object from the first data storage, retrieve the data object from the first data storage and store it in the local data storage.

11. The system as in claim 8, wherein the processor is further configured to:
in the event that it was determined to retrieve the data object from the second data storage, retrieve the data object from the second data storage, uncompress the data object, and store it in the local data storage.

12. The system as in claim 11, wherein the processor is further configured to:
in the event that it is determined to store the data object in the first data storage, delete the data object from the second data storage.

13. The system as in claim 11, wherein the processor is further configured to:
in the event that it is determined to store the data object in the first data storage, leaving the data object stored on the second compressed data storage.

14. The system as in claim 1, wherein the first archiving threshold comprises a usage amount.

15. The system as in claim 14, wherein the usage amount comprises an access per time period.

16. The system as in claim 1, wherein the determining of whether the data storage criterion for the first data storage is satisfied occurs at one of the following: continuously, periodically, at a fixed time, or at regular interval.

17. A method for dynamically utilizing data storage, comprising:
retrieving a data object and storing the data object in a local data storage, wherein the data object comprises an indicator, the indicator indicating whether, after processing the data object is complete, the data object is to be stored in a first data storage corresponding to uncompressed data storage, or compressed and stored in a second data storage corresponding to compressed data storage, wherein the indicator is based on a keep threshold;
processing the data object stored in the local data storage;
after processing the data object, storing the data object in the first data storage or compressing and storing the data object in the second data storage based on the indicator;
determining whether an archiving threshold for the first data storage is satisfied; and
in the event that the archiving threshold for the first data storage is satisfied:
determining a first archiving threshold based on a target data storage usage level, wherein determining the first archiving threshold comprises one of:
ordering objects stored in the first data storage by activity level and determining an activity threshold to remove a necessary amount of data for a data storage usage to be below the target data storage usage level; and
determining the necessary amount of data that would be removed for one or more test archiving thresholds, and choosing the test archiving threshold that removes closest to the necessary amount of data; and
setting a new archiving threshold based at least in part on the first archiving threshold.

18. A computer program product for dynamically utilizing data storage, the computer program product being embodied in a tangible non-transitory computer readable storage medium and comprising computer instructions for:
retrieving a data object and storing the data object in a local data storage, wherein the data object comprises an indicator, the indicator indicating whether, after processing the data object is complete, the data object is to be stored in a first data storage corresponding to uncompressed data storage, or compressed and stored in a second data storage corresponding to compressed data storage, wherein the indicator is based on a keep threshold;

processing the data object stored in the local data storage;

after processing the data object, storing the data object in the first data storage or compressing and storing the data object in the second data storage based on the indicator;

determining whether an archiving threshold for the first data storage is satisfied; and in the event that the archiving threshold for the first data storage is satisfied:

determining a first archiving threshold based on a target data storage usage level, wherein determining the first archiving threshold comprises one of:

ordering objects stored in the first data storage by activity level and determining an activity threshold to remove a necessary amount of data for a data storage usage to be below the target data storage usage level; and determining the necessary amount of data that would be removed for one or more test archiving thresholds, and choosing the test archiving threshold that removes closest to the necessary amount of data; and setting a new archiving threshold based at least in part on the first archiving threshold.

19. The system as in claim 1, wherein the processor is further configured to determine whether the data object was modified.

* * * * *